United States Patent
Yamane

(10) Patent No.: US 9,861,944 B2
(45) Date of Patent: Jan. 9, 2018

(54) RESIN DISCHARGE MECHANISM HAVING COOLED SLIDE BAR

(71) Applicant: Kobe Steel, Ltd., Kobe-shi (KR)

(72) Inventor: Koji Yamane, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 635 days.

(21) Appl. No.: 14/288,968

(22) Filed: May 28, 2014

(65) Prior Publication Data
US 2015/0029814 A1    Jan. 29, 2015

(30) Foreign Application Priority Data
Jul. 23, 2013   (JP) .................................. 2013-152632

(51) Int. Cl.
  *B29B 7/58*   (2006.01)
  *B29C 47/82*  (2006.01)
  (Continued)

(52) U.S. Cl.
  CPC .......... *B01F 15/0287* (2013.01); *B01F 15/06* (2013.01); *B29B 7/465* (2013.01);
  (Continued)

(58) Field of Classification Search
  CPC ................ B01F 15/0287; B01F 15/06; B01F 2015/061; B29B 7/582; B29B 7/465; B29C 47/0811; B29C 47/822
  (Continued)

(56) References Cited

U.S. PATENT DOCUMENTS

| 2,633,602 | A | * | 4/1953 | Sverdrup | ................ | B29B 17/00 366/145 |
| 4,721,589 | A | * | 1/1988 | Harris | ................. | B29C 47/0014 264/40.1 |

(Continued)

FOREIGN PATENT DOCUMENTS

| JP | 10-6330 A | 1/1998 |
| JP | 2011-20345 A | 2/2011 |

OTHER PUBLICATIONS

Shin Hotani, et al., "Continuous Mixers and Twin-screw Extruders for Polyolefin Finishing", R&D Kobe Steel Engineering Report, vol. 58, No. 2, Aug. 2008, 7 pages.
(Continued)

*Primary Examiner* — Charles Cooley
(74) *Attorney, Agent, or Firm* — Oblon, McClelland, Maier & Neustadt, L.L.P.

(57) ABSTRACT

To suppress the thermal expansion of a slide bar and to prevent occurrence of failures such as galling or malfunctioning to the slide bar, a resin discharge mechanism, provided in mixing equipment that includes a barrel having a hollow interior and a pair of mixing rotors accommodated in the barrel and that mixes a resin material by causing the paired mixing rotors to rotate within the barrel, for discharging a part of the resin material mixed by the mixing rotors to an outside of the barrel, the resin discharge mechanism including: a resin discharge passage provided in the barrel, and communicating an inside of the barrel with the outside of the barrel; a slide bar closing or opening the resin discharge passage by moving across the resin discharge passage; and a cooling device provided within the slide bar, and cooling the slide bar using a cooling fluid.

5 Claims, 5 Drawing Sheets

(51) Int. Cl.
*B01F 15/02* (2006.01)
*B29C 47/08* (2006.01)
*B01F 15/06* (2006.01)
*B29B 7/46* (2006.01)

(52) U.S. Cl.
CPC .......... *B29B 7/582* (2013.01); *B29C 47/0811* (2013.01); *B29C 47/0822* (2013.01); *B01F 2015/061* (2013.01)

(58) Field of Classification Search
USPC .......................... 366/77, 144–149, 192–193
See application file for complete search history.

(56) References Cited

U.S. PATENT DOCUMENTS

| | | | | |
|---|---|---|---|---|
| 5,204,045 | A * | 4/1993 | Courval | B29C 47/0004 264/323 |
| 5,232,281 | A * | 8/1993 | Campbell | B01F 15/00779 366/144 |
| 2005/0213423 | A1 * | 9/2005 | Ferencz | B29C 47/0011 366/76.2 |
| 2009/0098234 | A1 * | 4/2009 | Graetz | B29C 45/60 425/209 |
| 2012/0178892 | A1 * | 7/2012 | Van Citters | B29C 47/0002 526/352 |
| 2013/0106011 | A1 * | 5/2013 | Amurri | B29C 47/0004 264/40.1 |
| 2015/0029814 | A1 * | 1/2015 | Yamane | B29B 7/465 366/144 |

OTHER PUBLICATIONS

Yoshiaki Nakata, et al., "LCM Mixing and Pelletizing System for Polyolefin", R&D Kobe Steel Engineering Report, vol. 55, No. 2, Sep. 2005, 5 pages.

Dietmar Schmid, "Machinery Manufacturing Equipment Control" China Machine Press, First edition, First printing, Nov. 2010, p. 327 (with Cover Page and Partial English language translation).

Shen Kai-Zhi, "Plastic Mold", China Light Industry Press, 3$^{rd}$ Edition, 1$^{st}$ Printing, Mar. 2013, pp. 234-237 (with partial English translation).

* cited by examiner

RESIN DISCHARGE MECHANISM HAVING COOLED SLIDE BAR

BACKGROUND OF THE INVENTION

Field of the Invention

The present invention relates to a resin discharge mechanism for use at a time of discharging a resin material mixed in mixing equipment to the outside of the mixing equipment for a sampling inspection or the like.

Description of the Related Art

Generally, a manufacturing plant for general-purpose polyolefin-based resins is equipped with a mixing and pelletizing apparatus for pelletizing the materials of these resins. This mixing and pelletizing apparatus is configured to include mixing equipment such as a continuous mixer that mixes these resin materials and a pelletizer that pelletizes the resin materials mixed by the mixing equipment. For example, the continuous mixer includes a cylindrical barrel provided horizontally and a pair of mixing rotors inserted into this barrel for mixing a material. A feed portion that supplies the material such as polymeric resin pellets is provided on one side of the barrel in a longitudinal direction in the continuous mixer, and the material supplied to the feed portion is fed to a mixing portion provided halfway along the barrel in the longitudinal direction. The mixing portion mixes the material between the paired mixing rotors with a shear force applied to the material, and feeds the melted material by the mixing to a drawing portion (mixing-degree adjustment portion) provided on the other side of the barrel in the longitudinal direction. The drawing portion adjusts the mixing degree by increasing (boosting) the internal pressure of the material. In this way, the material for which the drawing portion adjusts the mixing degree is fed to a post-processing portion from a discharge portion located downstream of the drawing portion via a gear pump or the like. (Refer to Hotani Shin and Yoshinori Kuroda (2008), "Continuous Mixers and Twin-screw Extruders for Polyolefin Finishing", *R&D Kobe Steel Engineering Report*, Vol. 58, No. 2 (August, 2008), pp. 74-80; and Nakata Yoshiaki, Nobuhiro Yamasaki, Shoji Yasuda, and Kazuo Iritani (2005), "LCM Mixing and Pelletizing System for Polyolefin", *R&D Kobe Steel Engineering Report*, Vol. 55, No. 2 (September, 2005), pp. 114-118.)

In the mixing equipment such as the continuous mixer described above or an extruder, it is often required to extract and inspect the mixed resin material before processing the resin material into finished products to determine whether the mixed resin material satisfies a desired mixing degree. In this case, it is necessary to additionally provide a resin discharge mechanism (also referred to as "diverter valve") for extracting a part of the resin material that is not fed to the gear pump or the like yet as an inspection sample to the outside of the barrel.

For example, as shown in FIG. 6, a resin discharge mechanism 101 provided in conventional mixing equipment includes a resin discharge passage 116 (indicated by a black arrow in FIG. 6) provided on and open to a material transport channel 115 (indicated by a white arrow in FIG. 6) for feeding a mixed resin material from within a barrel 103 toward a gear pump and communicating the inside of the barrel 103 with the outside of the barrel 103, and a slide bar 117 closing or opening the resin discharge passage 116 by moving across this resin discharge passage 116. This slide bar 117 is capable of closing the resin discharge passage 116 by sliding in one direction by means of a hydraulic cylinder 120 or the like, and opening the resin discharge passage 116 by sliding in the other direction.

However, the inside of the barrel 103 is far higher in temperature than the outside thereof since the resin material is mixed with the shear force applied to the resin material and the high-temperature resin material plasticized as a result of the mixing flows in the barrel 103. Owing to this, the tip end side of the slide bar 117 closer to the inner surface of the barrel 103 (chamber) is higher in temperature than the base end side of the slide bar 117 closer to the outer surface of the barrel 103. As a result, a large temperature difference is generated between the tip end side and the base end side of the slide bar 117. This temperature difference generated in the slide bar 117 disadvantageously and often causes the tip end side of the slide bar 117 to be thermally expanded more greatly than the base end side thereof.

If the slide bar 117 is to slide with the diameter of the slide bar on the tip end side increased after the tip end side is thermally expanded more greatly than the base end side, the thermally expanded tip end side of the slide bar 117 is caught in a chamber side in small thermal expansion (tip-end-side opening edge of a guide bush 119). As a consequence, failures such as galling occur to the slide bar 117 and the chamber side, or even worse, the slide bar 117 cannot be pulled out from the chamber side, resulting in malfunctioning or the like.

Needless to say, the opening diameter of the chamber side can be set large enough in preparation for the possible increase in the diameter of the slide bar 117 on the tip end side due to the thermal expansion. To set the opening diameter large enough causes, however, the following problems. The resin material highly possibly enters the clearance between the slide bar 117 and the chamber side. The resin material entering the clearance is solidified or seized within the clearance, and remains as foreign matters. The resin material entering the clearance, in turn, disadvantageously causes galling or malfunctioning.

SUMMARY OF THE INVENTION

The present invention has been made to solve the aforementioned problems, and an object of the present invention is to provide a resin discharge mechanism capable of suppressing the thermal expansion of a slide bar and preventing the occurrence of failures such as galling or malfunctions to the slide bar.

To solve the above problems, technical measures are taken in the resin discharge mechanism according to the present invention as follows.

That is, a resin discharge mechanism according to an aspect of the present invention is a resin discharge mechanism, provided in mixing equipment that includes a barrel having a hollow interior and a pair of mixing rotors accommodated in the barrel and that mixes a resin material by causing the paired mixing rotors to rotate within the barrel, for discharging a part of the resin material mixed by the mixing rotors to an outside of the barrel, the resin discharge mechanism including: a resin discharge passage provided in the barrel, and communicating an inside of the barrel with the outside of the barrel; a slide hole provided in the barrel to cross the resin discharge passage; a slide bar closing or opening the resin discharge passage by moving within the slide hole; and a cooling device provided within the slide bar, and cooling the slide bar using a cooling fluid.

A cylindrical guide bush may be fitted into the slide hole, the cylindrical guide bush slidably accommodating therein the slide bar.

The cooling device may include a circulation hole guiding the cooling fluid along a longitudinal direction of the slide bar; and a baffle plate provided within the circulation hole, and guiding the cooling fluid to a tip end side of the circulation hole.

A heating device heating the barrel may be provided within an inner circumferential wall of the barrel to surround the slide hole.

The guide bush may be formed of a metal material higher in thermal expansion coefficient than a material of the slide bar.

A small-diameter portion recessed radially inward may be provided on an outer circumferential surface of the slide bar.

The resin discharge mechanism according to the present invention can suppress the thermal expansion of the slide bar and prevent failures such as galling or malfunctioning in the slide bar.

DESCRIPTION OF THE PREFERRED EMBODIMENTS

Figure 1:
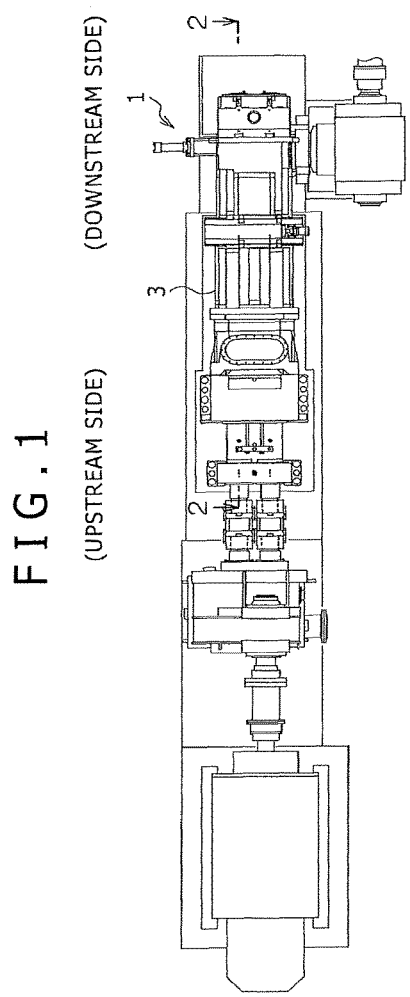
FIG. 1 is a plan view of a continuous mixer provided with a resin discharge mechanism according to a first embodiment of the present invention.

Hereinafter, a resin discharge mechanism 1 according to preferred embodiments of the present invention will be described in detail by referring to the drawings.

First Embodiment

Mixing equipment (a continuous mixer 2) in which the resin discharge mechanism 1 according to a first embodiment is provided will first be described.

Figure 2:
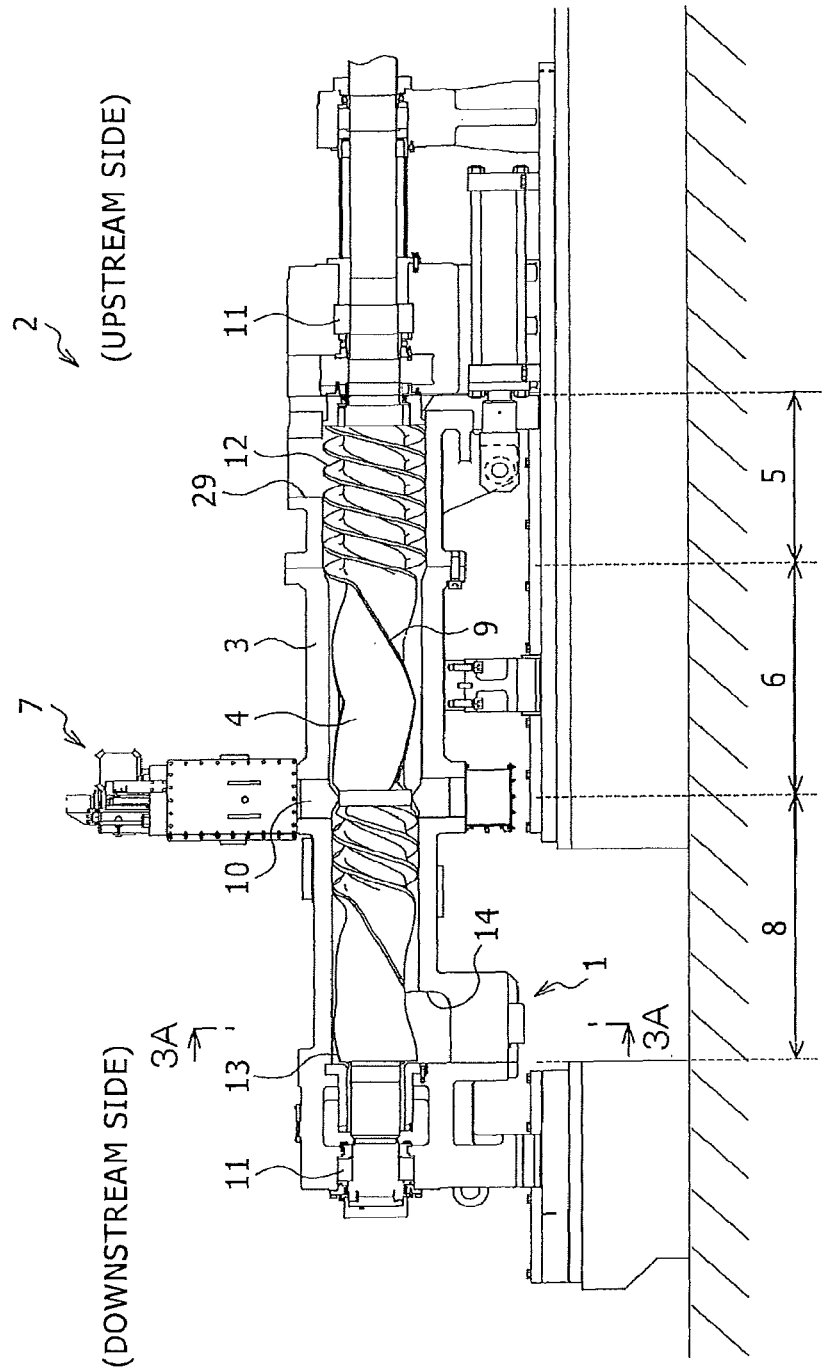
FIG. 2 is a cross-sectional view taken along a line 2-2 of FIG. 1.

As shown in FIGS. 1 and 2, the continuous mixer 2 according to the first embodiment includes a barrel 3 formed to have a hollow interior and a pair of mixing rotors 4 inserted into the barrel 3 along an axial center direction. In the continuous mixer 2, the paired mixing rotors 4 rotate in opposite directions while being engaged with each other. That is, in the continuous mixer 2, a material such as a resin material is mixed between the paired mixing rotors 4 to follow the rotation of the paired mixing rotors 4.

In the following description, a right side of a sheet of FIG. 2 is assumed as an upstream side and a left side thereof is assumed as a downstream side when describing the continuous mixer 2. In addition, a lateral direction of the sheet of FIG. 2 is assumed as an axial direction when describing the continuous mixer 2.

As shown in FIGS. 1 and 2, the barrel 3 is formed into a long cylindrical shape along the axial direction, and the barrel 3 has the hollow interior in such a manner that a cross-section in a perpendicular direction to the axial direction is formed into a shape of two circles with parts of circumferences of the circles overlapping each other. The barrel 3 is divided into a plurality of portions (four in an example of FIG. 2) along the axial direction. These four portions are constituted by a feed portion 5 that supplies the material, a mixing portion 6 that mixes the material, a drawing portion 7 that increases an internal pressure of the material, and a discharge portion 8 that discharges the material to an outside of the barrel 3 in this order from an upstream side along a flow direction of the resin material.

The feed portion 5 includes a material supply port 29 open upward so as to communicate an inside of the barrel 3 with the outside thereof. This material supply port 29 is formed to vertically penetrate an upper wall surface of the barrel 3, so that the material can be supplied into the barrel 3 from the material supply port 29.

The mixing portion 6 is provided halfway along the barrel 3 in the axial direction of the barrel 3. To be precise, the mixing portion 6 is a portion provided downstream of the feed portion 5. A mixing flight part 9 is used in each of the mixing rotors 4 at a position corresponding to this mixing portion 6. The mixing portion 6 is the portion that mixes the material supplied from the feed portion 5 into the barrel 3 using the mixing flight parts 9.

The drawing portion 7 is a portion arranged downstream of the mixing portion 6 and functions to make the material stay in the mixing portion 6 and to adjust a mixing degree of the material. The drawing portion 7 includes a gate member 10 that can block or change a flow of the material circulating in the barrel 3, and the drawing portion 7 can adjust the mixing degree by allowing the gate member 10 to change a circulating velocity of the material. The discharge portion 8 that discharges the mixed material to the outside of the barrel 3 is provided downstream of this drawing portion 7, i.e., on a most downstream side in the barrel 3.

The mixing rotors 4 are a pair of right and left mixing rotors 4 provided to be inserted into the barrel 3 described above. Each mixing rotor 4 is provided so that a rotational center of the mixing rotor 4 matches a center of each of the two circles that form the hollow interior of the barrel 3. The mixing rotors 4 are supported by bearings 11 outward of both ends of the barrel 3, respectively. The paired mixing rotors 4 include a plurality of types of flight parts axially, having different functions to correspond to the feed portion 5, the mixing portion 6, and the discharge portion 8, respectively.

That is, screw flight parts 12 feeding the material downstream by means of a helically twisted vane form are provided in the feed portion 5. The mixing flight parts 9 mixing the material by applying a shear force to the material are provided in the mixing portion 6. Discharge vanes 13 discharging the material mixed in the mixing portion 6 to the outside of the barrel 3 are provided in the discharge portion 8.

Figure 3A:
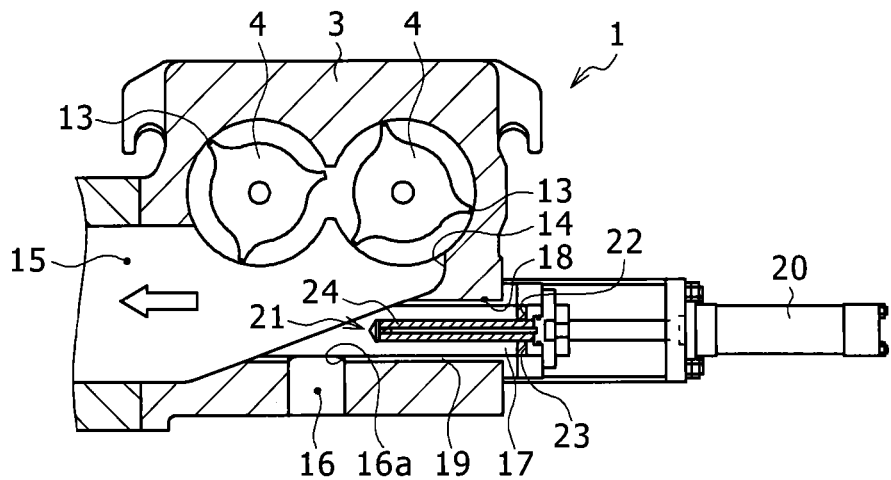
FIG. 3A is a cross-sectional view taken along a line 3A-3A of FIG. 2 and is a cross-sectional view of the resin discharge mechanism.

FIG. 3A is a cross-sectional view (3A-3A cross-sectional view) showing that the continuous mixer 2 shown in FIG. 2 is cut away at a position of the discharge portion 8.

As shown in FIG. 3A, the discharge portion 8 is the portion provided in an end portion on the most downstream side of the barrel 3. The discharge vanes 13 discharging the material within the barrel 3 are provided on the mixing rotors 4 to correspond to the discharge portion 8 in the axial direction. A discharge port 14 is formed in a lower circumferential wall of the barrel 3 corresponding to a position of the discharge portion 8. A gear pump (not shown) feeds the material extracted from this discharge port 14 while applying a pressure to the material. A screen changer removes foreign matters from the material fed by the gear pump, and then a pelletizer processes the resultant material into granular pellets.

Meanwhile, the resin discharge mechanism 1 characteristic of the present invention is provided in the discharge portion 8 of the continuous mixer 2 described above.

This resin discharge mechanism 1 is intended to discharge (extract) a part of the resin material mixed by the mixing rotors 4 to the outside of the barrel 3. While the resin material discharged by means of the resin discharge mechanism 1 is delivered to a resin-material conveyance vehicle (not shown) or the like that stops below the barrel 3, a part of the resin material is used for a sampling inspection for checking a mixing state of the resin material.

Specifically, a material transport channel 15 (indicated by a white arrow in FIG. 3A) feeding the resin material to the pelletizer from the discharge port 14 via the gear pump is provided in the discharge portion 8 of the continuous mixer 2 described above. The resin discharge mechanism 1 according to the present invention is provided on this material transport channel 15, and a part of the resin material flowing in the material transport channel 15 is discharged (extracted) to the outside of the barrel 3. Furthermore, the resin discharge mechanism 1 includes a resin discharge passage 16 (indicated by a gray arrow in FIG. 3C) discharging the resin material flowing through the material transport channel 15 to the outside of the barrel 3, and a slide bar 17 moving across this resin discharge passage 16 and closing or opening the resin discharge passage 16. This slide bar 17 is accommodated in a guide bush 19 fitted into a slide hole 18 penetrating the circumferential wall of the barrel 3, and designed to be able to enter or exit the guide bush 19 so as to cross the resin discharge passage 16 described above. The resin discharge passage 16 is provided to penetrate the circumferential wall of the barrel 3 and the guide bush 19.

A hydraulic cylinder 20 pushing or pulling the slide bar 17 is provided laterally of this slide bar 17, and this hydraulic cylinder 20 enables the slide bar 17 to enter or exit the guide bush 19. A cooling device 21 cooling the slide bar 17 using a cooling fluid is provided in the slide bar 17. To provide the cooling device 21 is characteristic of the resin discharge mechanism 1 according to the present invention.

The resin discharge passage 16, the slide bar 17, the slide hole 18, the guide bush 19, the hydraulic cylinder 20, and the cooling device 21 that constitute the resin discharge mechanism 1 according to the present invention will next be described.

The resin discharge passage 16 is a flow passage for discharging the resin material within the barrel 3 to the outside of the barrel 3. In the first embodiment, the resin discharge passage 16 is formed along a vertical direction to penetrate the lower circumferential wall of the barrel 3 and a lower surface of the guide bush 19. Specifically, the material transport channel 15 described above is provided in a lower portion of the barrel 3 in the discharge portion 8. The above-described slide hole 18 into which the guide bush 19 is fitted is formed on an inner circumferential surface of this material transport channel 15, and the resin discharge passage 16 is formed to be open to an inner circumferential surface of this slide hole 18.

The slide hole 18 is a hole into which the guide bush 19 is fitted and that is formed along the horizontal direction. One end of the slide hole 18 is open to an inner wall surface of the material transport channel 15 of the barrel 3 whereas the other end of the slide hole 18 is open to an outer sidewall of the barrel 3. An upper-end-side opening 16a of the resin discharge passage 16 is formed halfway along this slide hole 18 in the horizontal direction. This upper-end-side opening 16a of the resin discharge passage 16 is formed on a one-end-side (barrel-inner-side) inner circumferential surface of the slide hole 18 among the inner circumferential surface of the slide hole 18, and a lower end of the resin discharge passage 16 is open to a lower surface (bottom surface) of the barrel 3, so that the resin material within the barrel 3 can be taken outside of the barrel 3 through the resin discharge passage 16.

Because of this configuration, the upper-end-side opening 16a of the resin discharge passage 16 is opened when the slide bar 17 accommodated in the guide bush 19 fitted into the slide hole 18 moves to one side in the horizontal direction, and is closed when the slide bar 17 moves to the other side in the horizontal direction.

Figure 3B:
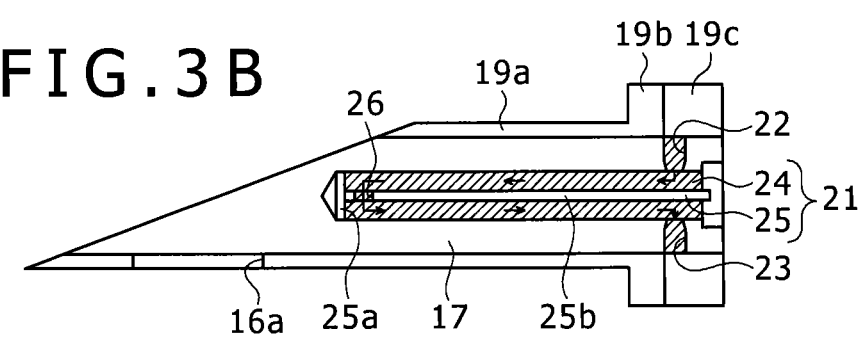
FIG. 3B is an enlarged cross-sectional view of a slide bar.

As shown in FIG. 3B, the slide bar 17 is a cylindrical member arranged along the horizontal direction (lateral direction in an example shown in FIG. 3B). This slide bar 17 is accommodated in the guide bush 19 in a horizontally movable manner, and the guide bush 19 accommodating therein the slide bar 17 is further fitted into the slide hole 18. A rolled steel for general structure (SS material) such as SS400 relatively low in thermal expansion coefficient is used as a material of this slide bar 17 so as to facilitate securing a certain clearance between the slide bar 17 and the guide bush 19.

A tip end of the slide bar 17 is formed into a planar shape inclined in the same direction as that of the inner wall surface of the material transport channel 15. At a position at which the slide bar 17 makes the most progress toward a tip end side of the guide bush 19, a tip end surface of the slide bar 17 is flush with the inner wall surface of the material transport channel 15 of the barrel 3.

A base end side of the slide bar 17 is coupled to the hydraulic cylinder 20 and the hydraulic cylinder 20 allows the horizontal movement of the slide bar 17.

The guide bush 19 is a sliding member allowing the slide bar 17 to smoothly slide and formed into a cylindrical shape having a flange provided in one longitudinal end portion. The guide bush 19 is constituted by a cylindrical portion 19a in which the slide bar 17 can be accommodated and a flange portion 19b provided in one end (base end) portion of the cylindrical portion 19a. The cylindrical portion 19a of the guide bush 19 is fitted into the slide hole 18 from outside (right). The tip end side (facing the inside of the barrel 3) of the guide bush 19 is cut into an inclined shape similar to that of the slide bar 17, and flush with the inner wall surface of the material transport channel 15. A base end side (facing the outside of the barrel 3) of the guide bush 19 is formed as the flange portion 19b larger in diameter than the tip end side, and the contact of this flange portion 19b with an outer surface of the barrel 3 allows the positioning of the guide bush 19 fitted into the slide hole 18.

In this slide bar 17, a liquid supply portion 22 radially penetrating the slide bar 17 for supplying the cooling fluid into the slide bar 17 and a liquid drainage portion 23 draining the cooling fluid to an outside of the slide bar 17 are formed in upper and lower portions of the slide bar 17, respectively. The fluid supply portion 22 and the fluid drainage portion 23 are connected to a cooling fluid pipe (not shown), and vertically penetrate the slide bar 17 to be able to supply the cooling fluid into the slide bar 17 and to discharge the cooling fluid completed with cooling to the outside of the slide bar 17.

A notch 19c is formed in the flange portion 19b near the hydraulic cylinder 20. If the slide bar 17 moves forward toward the tip end side of the guide bush 19, the cooling fluid pipe connected to both the liquid supply portion 22 and the liquid drainage portion 23 is accommodated in this notch 19c. Owing to this, as described later, the slide bar 17 can move forward toward the tip end side of the guide bush 19 until the tip end surface of the slide bar 17 becomes flush with the inner wall surface of the material transport channel 15 and the slide bar 17 closes the resin discharge passage 16 without interference between the flange portion 19b and the cooling fluid pipe.

A bronze cast material such as BC3 higher in thermal expansion coefficient than the SS material constituting the slide bar 17 is used as a material of the guide bush 19. By using the metal material having a higher thermal expansion coefficient than that of the slide bar 17 as the material of the guide bush 19, the clearance is generated more easily between the guide bush 19 and the slide bar 17 due to a difference between structural materials in thermal expansion coefficient at a time of heating. This can facilitate pulling out the slide bar 17 from the guide bush 19 and suppressing the occurrence of failures such as galling or malfunctioning.

As shown in FIG. 3A, the hydraulic cylinder 20, which is provided on the base end side of the slide bar 17, moves the slide bar 17 in the horizontal direction (lateral direction in FIG. 3A) by the action of hydraulic pressure and enables the slide bar 17 to enter or exit the guide bush 19 along the horizontal direction. Specifically, the hydraulic cylinder 20 is provided on a side surface of the base end side of the guide bush 19 and arranged to direct a rod thereof toward the tip end side of the guide bush 19 (left). The slide bar 17 is fixed to a tip end of the rod that can be contracted toward the base end side of the guide bush 19.

Figure 3C:
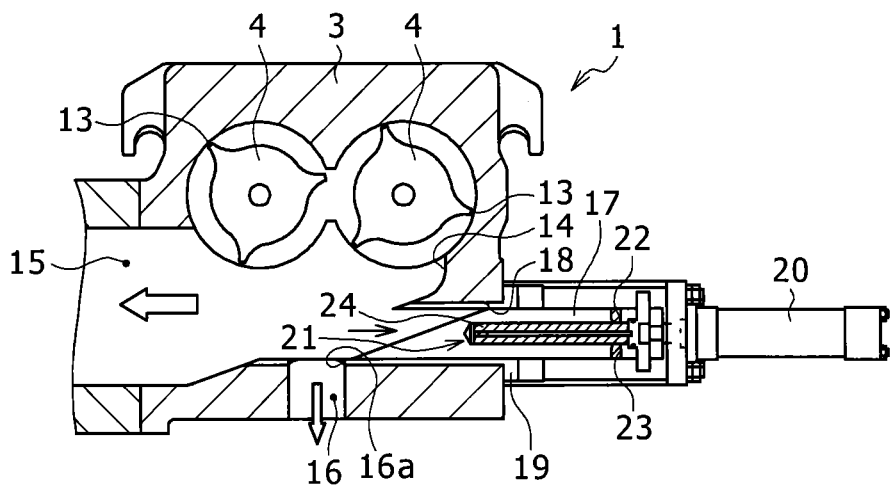
FIG. 3C is a cross-sectional view of the resin discharge mechanism in a state in which the slide bar is pulled out.

With this configuration, as shown in FIG. 3C, if the rod is contracted, then the slide bar 17 moves backward toward the base end side of the guide bush 19, and the resin discharge passage 16 communicates with the material transport channel 15. Conversely, as shown in FIG. 3A, if the rod is expanded, then the slide bar 17 moves forward toward the tip end side of the guide bush 19, the tip end surface of the slide bar 17 becomes flush with the inner wall surface of the material transport channel 15, and the resin discharge passage 16 is closed by the slide bar 17.

As shown in FIG. 3B, the cooling device 21, which is provided within the slide bar 17, cools this slide bar 17 using the cooling fluid and suppresses the thermal expansion of the slide bar 17 by cooling the slide bar 17.

A fluid cooled by a cooling tower (not shown) is used as this cooling fluid. Such a cooling fluid includes cooled water, cooled oil or cooled coolant or the like.

A circulation hole 24 guiding the cooling fluid along the longitudinal direction (horizontal direction) of this slide bar 17 is formed within the slide bar 17. The cooling fluid is supplied into this circulation hole 24 from the liquid supply portion 22 of the slide bar 17, or the cooling fluid is discharged from the liquid drainage portion 23 of the slide bar 17. A baffle plate 25 guiding the cooling fluid to a tip end side of the circulation hole 24 is provided in this circulation hole 24.

The circulation hole 24 is a hole that is formed within the slide bar 17 and in which the cooling fluid circulates, and is formed in a direction of an axial center of the slide bar 17. This circulation hole 24 extends from a base end surface of the slide bar 17 to the vicinity of the tip end side of the slide bar 17 along the horizontal direction through an axis of the slide bar 17, and can cool the slide bar 17 up to the vicinity of the tip end surface thereof.

The baffle plate 25 is a plate member inserted into the circulation hole 24 and enables the cooling fluid to circulate from one end to the other end of the slide bar 17 by partitioning an interior of the circulation hole 24 into upper and lower chambers. That is, the baffle plate 25 is configured to enable the slide bar 17 to be cooled entirely in the longitudinal direction. The baffle plate 25 is a combination of a disk-shaped tip end member 25a that can close the tip end side of the circulation hole 24 and a partitioning member 25b located closer to the base end side of the circulation hole 24 than this tip end member 25a and partitioning the interior of the circulation hole 24 into the upper and lower chambers. Furthermore, a conduction hole 26 moving the cooling fluid present in the upper chamber to the lower chamber is formed on a tip end side of this partitioning member 25b. That is, the cooling fluid circulates in the circulation hole 24 along a route in which the cooling fluid is introduced from the liquid supply portion 22 on the base end side of the slide bar 17 into the upper chamber of the circulation hole 24, flows in the upper chamber toward the tip end side of the circulation hole 24, moves from the conduction hole 26 on the tip end side of the partitioning member 25b to the lower chamber of the circulation hole 24, flows in the lower chamber toward the base end side of the circulation hole 24, and is drained from the liquid drainage portion 23 on the base end side of the slide bar 17.

Next, a method of discharging the resin material using the above-described resin discharge mechanism 1, that is, a resin discharge method according to the present invention will be described.

In a case in which the resin material to be discharged is unstable in quality and is not desired to flow into the downstream pelletizer such as a time right after the operation of the mixing equipment, the resin material is discharged to the outside using the resin discharge mechanism 1 described above. That is, as shown in FIG. 3C, the rod of the hydraulic cylinder 20 is contracted first to cause the slide bar 17 to move backward from the tip end side of the guide bush 19.

Since the cooling device 21 described above already cools the slide bar 17 by this time, the slide bar 17 can be easily moved backward from the tip end side of the guide bush 19. That is, without the cooling device 21, the tip end side of the slide bar 17 is often higher in temperature than the base end side thereof to make the tip end side larger in diameter than the base end side by the thermal expansion. In this case, it is often difficult to move the slide bar 17 backward. By providing the cooling device 21, by contrast, a temperature difference between the tip end side and the base end side of the slide bar 17 is smaller and the increase in the diameter of the tip end side of the slide bar 17 is suppressed. Therefore, it is possible to secure the sufficient clearance between the slide bar 17 and the guide bush 19 and smoothly move the slide bar 17 backward.

If the slide bar 17 moves backward toward the base end side of the guide bush 19 within the guide bush 19 as described above, the opening 16a of the resin discharge passage 16 is exposed to the inner circumferential surface of the slide hole 18 into which the guide bush 19 is fitted, whereby the resin discharge passage 16 communicates with the material transport channel 15 via the slide hole 18. As a result, a part of the resin material flowing in the material transport channel 15 flows into the resin discharge passage 16 by way of the slide hole 18, so that it is possible to discharge a part of the resin material to the outside of the barrel 3 through the resin discharge passage 16.

After finishing discharging the resin material, the hydraulic cylinder 20 is expanded to allow the slide bar 17 to move forward as shown in FIG. 3A. If the slide bar 17 moves forward until the tip end surface of the slide bar 17 becomes flush with the inner wall surface of the material transport channel 15 of the barrel 3 (front end surface of the guide bush 19), the opening 16a of the resin discharge passage 16 exposed to the inner circumferential surface of the slide hole 18 into which the guide bush 19 is fitted is closed, so that the resin material is not discharged to the outside of the barrel 3 through the resin discharge passage 16.

As long as the resin discharge mechanism 1 that includes the above-described cooling device 21 is used, the slide bar 17 is cooled by the cooling fluid and it is, therefore, possible to suppress the thermal expansion of the slide bar 17. As a result, the temperature difference between the tip end side and the base end side of the slide bar 17 decreases and the increase in the diameter of the tip end side of the slide bar 17 is suppressed. This can facilitate pulling out the slide bar 17 and prevent the occurrence of the failures such as galling or malfunctioning to the slide bar 17 and the guide bush 19.

Moreover, if the guide bush 19 is formed of the metal material higher in thermal expansion coefficient than the material of the slide bar 17, that is, if the guide bush 19 and the slide bar 17 are formed of different metal materials, it is also possible to prevent the seizure of the slide bar 17 to the guide bush 19.

Second Embodiment

The resin discharge mechanism 1 according to a second embodiment will be described with reference to the drawing.

Figure 4:
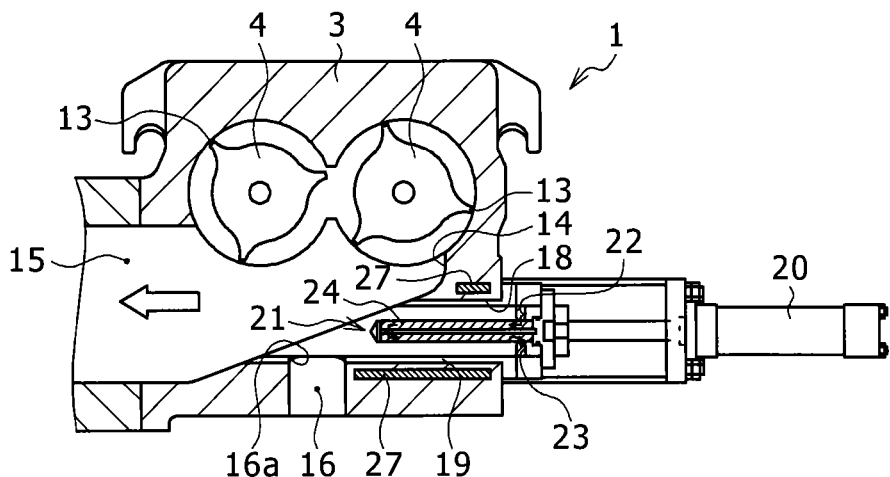
FIG. 4 is a cross-sectional view of a resin discharge mechanism according to a second embodiment of the present invention.

As shown in FIG. 4, the resin discharge mechanism 1 according to the second embodiment includes a heating device 27 located at the end of the guide bush farther from the barrel 3 for heating the barrel 3 in a corresponding region within the circumferential wall of the barrel 3 to surround the slide hole 18.

Specifically, this heating device 27 heats the guide bush 19 outside of the slide bar 17 by introducing a heating fluid (heated oil, for example) into the circumferential wall of the barrel 3, and provides a heating channel in which the heating fluid circulates within the circumferential wall of the barrel 3 to surround the slide hole 18. This heating channel is horizontally narrower above the guide bush 19 and horizontally wider below the guide bush 19 in proportion to the inclination of the inner circumferential surface of the material transport channel 15. This allows the heating fluid to be uniformly supplied to an outer circumferential surface of the guide bush 19 and the guide bush 19 to be evenly heated.

If the guide bush 19 is heated as described above, the temperature difference between the guide bush 19 and the slide bar 17 further increases. As a result, the guide bush 19 is thermally expanded by being heated and the clearance between the guide bush 19 and the slide bar 17 further widens by the use of the heating device 27 in addition to the slide bar 17 cooled by the cooling device 21 described above. This can further ensure preventing the occurrence of failures such as galling or malfunctioning.

Third Embodiment

The resin discharge mechanism 1 according to a third embodiment will be described with reference to the drawing.

Figure 5:
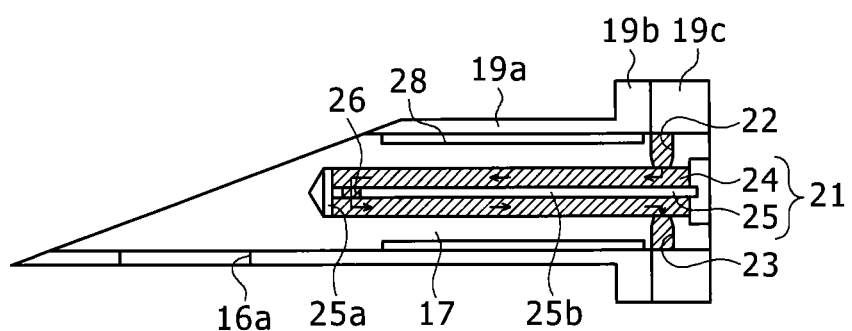
FIG. 5 is a cross-sectional view of a slide bar provided in a resin discharge mechanism according to a third embodiment of the present invention.
Figure 6:
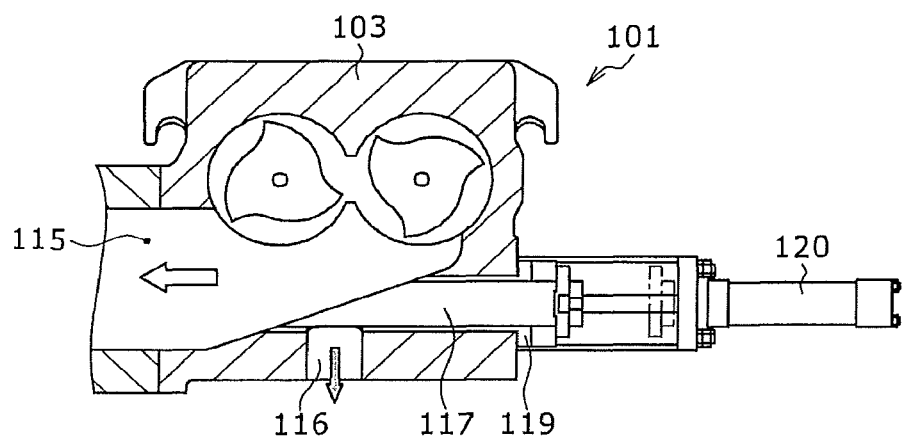
FIG. 6 is a cross-sectional view of a conventional resin discharge mechanism.

As shown in FIG. 5, in the resin discharge mechanism 1 according to the third embodiment, a small-diameter portion 28 (recessed portion) recessed radially inward is formed on an outer circumferential surface of the slide bar 17.

That is, an outside diameter of this small-diameter portion 28 is smaller than that of the slide bar 17 according to the first embodiment. Therefore, the outer circumferential surface of the slide bar 17 inserted into the guide bush 19 is radially distanced from an inner circumferential surface of the guide bush 19, thereby forming a radially large clearance between the slide bar 17 and the guide bush 19.

By providing such a small-diameter portion 28, an area by which the outer circumferential surface of the slide bar 17 contacts the inner circumferential surface of the guide bush 19 decreases, that is, the number of portions in which the slide bar 17 slides on the guide bush 19 decreases. It is, therefore, possible to further ensure preventing the occurrence of failures such as galling or malfunctioning. To this end, it is preferable that the small-diameter portion 28 according to the third embodiment is provided in addition to the cooling device 21 according to the first embodiment and/or the heating device 27 according to the second embodiment. It is to be contemplated that the embodiments disclosed in the present specification are all given for illustrative purposes and not for limiting the invention. In the embodiments disclosed in the present specification, values that do not depart from the normal implementation scope for those skilled in the art and that could be easily attained by those skilled in the art are adopted particularly for items that are not explicitly disclosed herein such as, for example, operating conditions, operational conditions, various parameters, and dimensions, weights, and volumes of constituent elements.

What is claimed is:

1. A resin discharge mechanism, provided in mixing equipment that includes a barrel having a hollow interior and a pair of mixing rotors accommodated in the barrel and that mixes a resin material by causing the paired mixing rotors to rotate within the barrel, for discharging a part of the resin material mixed by the mixing rotors to an outside of the barrel, the resin discharge mechanism comprising:
   a resin discharge passage provided in the barrel, and communicating an inside of the barrel with the outside of the barrel;
   a slide hole provided in the barrel to cross the resin discharge passage;
   a slide bar closing or opening the resin discharge passage by moving within the slide hole; and
   a cooling device provided within the slide bar, and cooling the slide bar using a cooling fluid,
   wherein a cylindrical guide bush is fitted into the slide hole, the cylindrical guide bush slidably accommodating therein the slide bar, and
   wherein the guide bush is formed of a metal material higher in thermal expansion coefficient than a material of the slide bar.

2. A resin discharge mechanism, provided in mixing equipment that includes a barrel having a hollow interior and a pair of mixing rotors accommodated in the barrel and that mixes a resin material by causing the paired mixing rotors to rotate within the barrel, for discharging a part of the resin material mixed by the mixing rotors to an outside of the barrel, the resin discharge mechanism comprising:
   a resin discharge passage provided in the barrel, and communicating an inside of the barrel with the outside of the barrel;

a slide hole provided in the barrel to cross the resin discharge passage;

a slide bar closing or opening the resin discharge passage by moving within the slide hole; and a cooling device provided within the slide bar, and cooling the slide bar using a cooling fluid, wherein the cooling device comprises:

a circulation hole formed within the slide bar, and guiding the cooling fluid along a longitudinal direction of the slide bar; and a baffle plate provided within the circulation hole, and guiding the cooling fluid to a tip end side of the circulation hole.

3. The resin discharge mechanism according to claim 2, wherein the baffle plate includes a conduction hole at the tip end side of the circulation hole, the conduction hole permitting the cooling fluid to pass through the conduction hole and to flow along the longitudinal direction of the slide bar away from the tip end side of the circulation hole.

4. A resin discharge mechanism, provided in mixing equipment that includes a barrel having a hollow interior chamber, and a pair of mixing rotors accommodated in the hollow interior chamber of the barrel to mix a resin material, the resin discharge mechanism being provided within the barrel for discharging a part of the resin material mixed by the mixing rotors to an outside of the barrel, the resin discharge mechanism comprising:

a resin discharge passage provided in the barrel, communicating with the hollow interior chamber and being arranged to communicate the hollow interior chamber with the outside of the barrel;

a slide hole provided in the barrel at a location separate from the hollow interior chamber and arranged to cross the resin discharge passage, wherein one end of the slide hole, along a length thereof, is closer to the hollow interior chamber than is another end of the slide hole;

a slide bar movably provided in the slide hole for closing or opening the resin discharge passage by moving within the slide hole along the length thereof; and a cooling device provided within the slide bar, and cooling the slide bar using a cooling fluid, wherein a heating device provided in the barrel to surround and heat the slide hole, and wherein the heating device is provided to surround and heat at least a portion of the slide hole closer to the another end of the slide hole than to the one end of the slide hole.

5. A resin discharge mechanism, provided in mixing equipment that includes a barrel having a hollow interior and a pair of mixing rotors accommodated in the barrel and that mixes a resin material by causing the paired mixing rotors to rotate within the barrel, for discharging a part of the resin material mixed by the mixing rotors to an outside of the barrel, the resin discharge mechanism comprising:

a resin discharge passage provided in the barrel, and communicating an inside of the barrel with the outside of the barrel;

a slide hole provided in the barrel to cross the resin discharge passage;

a slide bar closing or opening the resin discharge passage by moving within the slide hole; and a cooling device provided within the slide bar, and cooling the slide bar using a cooling fluid, wherein a small-diameter portion recessed radially inward is provided on an outer circumferential surface of the slide bar.

* * * * *